# 2,796,352

PREPARATION OF DRIED EGG WHITE PRODUCT

Richard H. Forsythe, Park Forest, and Ralph W. Kline, Oak Lawn, Ill., assignors to Armour and Company, Chicago, Ill., a corporation of Illinois No Drawing. Application August 30, 1952,
Serial No. 307,382

4 Claims. (Cl. 99—210)

This invention relates to an egg white product and method of preparing the same. More particularly, it relates to a spray dried egg white product which upon rehydration has a pH value within the range of 7.0 to 8.0, and to a method for preparing the same.

In the production of commercial dried egg white, it is common practice to eliminate naturally occurring sugar components of egg white by means of various fermentation procedures. The depletion of egg white sugar through the use of microorganisms either naturally present in liquid egg white or introduced therein by inoculation with suitable microbiological cultures has been found to be effective against the development of deleterious flavors, odors and colors characteristic of untreated dried egg white.

The preparation of a dried egg white wherein commercial bakers' yeast is used as the inoculum to effect the desired fermentation is described in U. S. Patent No. 2,460,986, dated February 8, 1949. According to the process of this patent, sugar depletion is shown to be complete using various conditions of pH, yeast concentrations and fermentation periods.

In the prepared mix industry, it has been found that for best results, it is very desirable that the dried egg white used in certain ready-mix bakery goods have essentially a neutral pH. These prepared mixes concerning principally angel food and white cake formulations contain numerous ingredients some of which are apparently capable of undergoing chemical changes upon standing for prolonged periods of time as, for example, three months or longer. In particular, the leavening properties are seriously impaired such that an inferior cake is obtained upon subsequent processing and baking of the prepared cake mix. It is thought that the pH of the dried egg white influences the stability of shelf life of these prepared cake mixes. This conclusion has been substantiated by the observation that when essentially neutral dried egg white (pH 7.0 to 8.0) is used in the angel food or white cake prepared mixes, the deterioration previously encountered is significantly decreased.

It has been found to be generally undesirable to obtain a product having a pH within this desired range by adjusting the pH of the dried egg white, that is, subsequent to the drying operation as by the addition of alkalizing or acidifying reagents. When this is done, the functional performance (whipping time and foam characteristics) of such egg white material is considerably inferior. In addition, its taste is seriously impaired and odor development becomes relatively pronounced.

Due to complexities inherent in the constituents of egg white material, it has been extremely difficult to attain a direct or satisfactory measure of uniformity or control over the acidity or alkalinity of dried egg white product which has been subjected to sugar depletion by fermentation. Accordingly, there is no feasible process available to the industry whereby a substantially neutral dried egg white can be obtained directly and consistently.

We have discovered a fermentation procedure which is capable of consistently and uniformly producing a substantially neutral (pH 7.0 to 8.0) dried egg white. In addition to the production of a dried egg white of desired pH without the need of resorting to the addition of acidifying or alkalizing reagents to the dried egg white, we have also succeeded in eliminating the formation of egg white insolubles which are encountered in prior processes. While accomplishing these purposes by a process which can be used extensively in commercial production, we have also established the conditions wherein a substantially reduced amount of yeast may be used to effectively deplete the reducing sugar content of liquid egg white.

The principal object of our invention is the provision of a substantially neutral dried egg white product having properties particularly conducive to prolonged stability of prepared cake mixes such as angel food cake mixes, white cake mixes and others of the type thereof. Another object is the provision of a new and improved method in the production of dried egg white wherein the pH of the dried egg white can be controlled within a substantially neutral range (7.0 to 8.0) by means other than the addition of acidifying or alkalizing reagents to the dried product. Yet another object is the provision of a new and improved method in the production of dried egg white wherein the destruction of the reducing sugar is efficiently accomplished using a minimum amount of yeast suitable for the purpose. A further object is the provision of a new and improved dried egg white which contains all of the mucin and mucoid substances present in natural egg white. A still further object concerns the development of a new and improved process for producing spray-dried egg products wherein egg white scum formation is eliminated, thereby rendering unnecessary such steps as filtration, centrifugation or homogenization. Another object is the provision of a new method for the preparation of spray-dried egg white in yields hitherto unattained. Other objects and features of the invention will appear as the description progresses.

We have found that by making a very critical pH adjustment to between 6.0 and 6.3 at the initial stage of our process, followed by fermenting the acidified egg white liquid with commercial bakers' yeast at slightly elevated temperatures and agitating the mixture in a manner such that a minimum pH of 6.0 is maintained, we can obtain a sugar depleted liquid product which, upon spray drying, produces consistently and uniformly an essentially neutral dried egg white of pH 7.0 to 8.0 upon rehydration.

Our process can be successfully applied to various egg white liquids including the thick and thin components of fresh egg whites, storage egg whites, frozen egg whites which are thawed prior to use as well as to mixtures of any of the above liquids. The pH of natural egg whites vary in accordance with the nature of the egg white material being used but the effectiveness of our process is not limited in any way by such inherent variations of pH. It is noted, however, that liquid egg white which has undergone deterioration to an extent rendering it unfit for use in conventional dried egg white processes should not be used in the herein described procedure.

The initial acidification step in our process is critical since the fluctuation of the hydrogen ion concentration of the dried egg white product is very marked with only slight changes in the initial pH adjustment. We have found that only by having an initial pH adjustment of between 6.0 and 6.3 can we obtain the desired spray-dried egg white product having on reconstitution a pH between 7.0 to 8.0. For example, if the initial pH adjustment is below 6.0, a decidedly acid spray-dried egg white is obtained and if the initial adjustment is above 6.3, the spray dried egg white product has a pH value in excess of 8.0 It is also very important that a pH of at least 6.0 be maintained throughout the entire process for best results and also in order to prevent the precipitation or coagulation of any of the various proteins such as mucin present in egg white. It is desirable that the acid used in the initial pH adjustment be sufficiently diluted and added gradually to the stirred egg white liquid thereby preventing any localized excess acidity. The initial pH adjustment step to between 6.0 and 6.3 is not limited to the use of a specific acid but any inorganic or organic acid suitable for use in an edible product may be employed. Although we prefer to use C. P. hydrochloric acid (diluted with 3 parts of water) such acids as phosphoric, sulfuric, acetic, citric, lactic, etc., may be substituted. Lactic acid is particularly suitable for the process.

The acidified egg white liquid is warmed to the temperature selected for fermentation of the material. It is optional whether this heating step is done before or after inoculation of the liquid egg white with yeast. Although the reducing sugar may be substantially depleted over a wide range of fermentation temperatures, for example between 60 to 100° F., we prefer to operate the process at between 80 to 90° F., and for best results at about 85° F. By operating at these temperatures, using the yeast concentrations described below, a dried egg white product is obtained which is free of foreign taste and odor.

For the purpose of depleting the reducing sugar of egg white while at the same time making possible an essentially neutral dried egg white as an end product, we have found it important to use an inoculum of yeast identified as *Saccharomyces cerevisiae*, which, in addition to its availability for commercial scale operation, is also particularly conducive to the preparation of a stable and neutral dried egg white having no off-flavor or odor characteristics. We prefer to suspend the yeast in a small quantity of warm water or any other suitable solvent to make a paste or slurry prior to the addition of the inoculum to the egg white liquid.

The quantity of yeast used in the process can be varied between about 0.02 and 0.3 weight percent based upon the amount of liquid egg white depending on the temperature selected for operation and also the fermentation period deemed most suitable. For example, at a fermentation temperature of 85° F., it is necessary to use about 0.2% by weight of compressed yeast in order to effectively remove the reducing sugar of liquid egg white within a period of 3.5 to 4.0 hours. It is also possible to use as small an amount of yeast as about .02% by weight at the same fermentation temperature, but at this concentration, a sugar-free material is obtained after a fermentation period of from approximately 10 to 12 hours. An excellent product is obtained in either event and it is thus seen that appropriate conditions of temperature, yeast concentration and period of fermentation other than those specifically mentioned can be readily adopted by those skilled in the art. We prefer to use the minimal effective concentrations of yeast at a slightly elevated temperature for fermentation in the preparation of a neutral spray-dried egg white in view of the exacting requirements of the prepared cake mixes previously mentioned.

Scum formation encountered during the preparation of dried egg products including egg white has long been a source of considerable difficulty. In addition to causing a poor appearance in the dried egg white, the presence of the particulate matter, of which the scum is formed, adversely affects the functional properties of the dried product. Such steps as spray drying become extremely difficult if not impossible unless the scum is first removed or modified as to particle size in some manner as to permit unrestricted flow of the material through spray nozzles. Among the prior methods aimed at circumventing this difficulty has been the chemical disintegration of the coagulum or scum through the addition of specific reagents. Another approach has been the use of such devices as intense stirring or homogenization to produce a physical breakdown of the particulate matter. More commonly, the scum has been separated from the liquid mass by filtration or centrifugation and discarded. None of these methods have proven very satisfactory because of yield losses, changes in the egg white composition, deleterious effects caused by the added reagents or the need for extra handling such as homogenization, centrifugation or filtration.

We have found that by maintaining a pH of at least 6.0 throughout the entire pre-drying phase of the process, scum formation due to the coagulation of certain egg white constituents can be entirely prevented. This desired pH minimum can be maintained by adequate agitation of the material whereby the carbon dioxide which is formed during the fermentation of the liquid egg white is expelled from the system as a gas. The dissipation of $CO_2$ from the system as it is formed is essential in order to avoid the accumulation of an excessive amount of carbonic acid which in addition to lowering the pH of the system eventually causes the coagulation or precipitation of certain egg white constituents to form the scum.

Accordingly, through the practice of our invention whereby the scum formation is avoided, the usual scum losses frequently ranging between 5% to 10% by weight of the original egg white material are eliminated. In addition, the natural egg white composition is relatively free of contaminants which would be present if reagents were to be added to dissolve the scum. Our process does not require the previously mentioned operations such as filtration, homogenization, centrifugation and the like which are otherwise necessary either to separate or to disintegrate the particulate matter in fermented egg white.

All of the factors involved during the fermentation of egg white liquid which affect the pH of the system and hence the pH of the dried egg white are not clearly understood at the present time. During the depletion of the reducing sugars, $CO_2$ is given off. The rate of $CO_2$ formation is dependent on various factors such as fermentation temperatures, the amount of inoculum used, the pH of the system, the mode and rate of agitation, etc. A second potential source of $CO_2$ during the course of the reaction and an important factor in the formation of a neutral dried egg white is the carbonic acid-sodium bicarbonate buffer system reported as present in natural egg white liquids. Although the reaction mechanism during fermentation with reference to this buffer system is not clearly understood, the unpredictability and variations of the pH of dried egg white products hitherto prepared can probably be attributed in large measure to the effect of its presence under varying conditions of physical and chemical interaction.

A mode of agitation found to be effective in maintaining a pH of at least 6.0 in the fermenting egg white consists of stirring the liquid mass. Agitation sufficient to produce a visible vortex at the center of the liquid mass is adequate for the stated purpose. We prefer to stir the liquid with conventional equipment such as a Lightnin stirrer operating at approximately 450 R. P. M. The $CO_2$ displacement may also be satisfactorily effected by other means such as cascading, evacuating or recycling the fermenting egg white liquid through a suitable pump.

The constant agitation of the reaction mixture throughout the process is important for reasons other than making possible the designated minimum pH of 6.0 for the system. Among these advantages are included an improved and more efficient fermentation resulting from homogeneity of the liquid mass in contact with evenly dispersed organisms; a more efficient reaction by virtue of a uniform temperature distribution; and the minimized tendency toward the multiplication of anaerobic organisms due to increased oxygen availability.

After the fermented product is free of reducing sugar as indicated by conventional tests, it is then preferably cooled to 55 to 60° F. and spray dried. The cooling to 55 to 60° F. prior to spray drying though not essential to the process does restrict the development of microorganisms.

The spray drying step, however, contrasted to alternate means of drying as, for example, pan drying, is essential for the successful practice of our invention. Although the reason for this is not clearly understood, it is noted that when hydrochloric acid is used in the initial pH adjustment, the quantitative evaluation for chloride ion in the dried egg white shows practically no loss when the fermented material is spray dried. This drying procedure is accordingly found to be particularly conducive to minimal acid decomposition with reference to the critical amount used in the initial pH adjustment. At the same time, it is a very effective means of eliminating substantially all of the residual $CO_2$ from the fermentation step. In view of the critical effect of the initial pH adjustment within the designated limited range with respect to the desired pH of the essentially neutral dried product, a procedure such as spray drying or its equivalent must be used for dehydrating the fermented egg white liquid. Inlet temperatures during spray drying can be varied widely as between 250 to 400° F. without serious impediment to the effectiveness of the process but a preferred range lies between 270 to 310° F. Suitably we may use an inlet temperature of about 290° F. when operating at a liquid feed rate of approximately 500 to 1500 pounds per hour using a single nozzle. Exhaust temperatures can similarly be operated over a considerable range as, for example, between 130 to 180° F. but we prefer to use an exhaust temperature of about 150 to 160° F. The feed of liquid can also be varied depending on the size of the nozzle or nozzles used, providing the necessary adjustment is made between inlet and exhaust temperatures for drying the material with the desired degree of efficiency. Such adjustments can be made readily by persons skilled in the art since the pH of the dried product is not materially altered within reasonable limits of operation.

The product consistently varying in pH between 7.0 and 8.0 contains between 2% to 10% by weight of moisture and has excellent functional properties in addition to its being free from any odors and off-flavors. It is a stable, water soluble, dried egg white characterized by a white and fluffy appearance. In addition to the conventional uses of dried egg white, it is particularly adaptable to the previously stated exacting requirements of prepared mixes as in angel food or wihte cakes.

The invention will be further illustrated but is not limited by the following examples:

*Example I*

A 1000 pound batch of fresh liquid egg white having a pH of 9.1 as measured on a Beckmann, line-operated, glass electrode pH assembly, was carefully acidified in a stainless steel vat to a pH of 6.1. The 4.3 pounds of C. P. hydrochloric acid required for this adjustment was diluted with 3 volumes of water prior to use. The acid was added to the egg white slowly and with constant agitation of the egg white in order to prevent local excesses of acid and subsequent denaturation of egg white proteins.

The acidified egg white was then warmed to 85° F. and 0.25 pound of yeast (*Saccharomyces cerevisiae*) suspended in warm water to make a slurry was added gradually. The mixture was agitated rapidly by means of a Lightnin stirrer rotating at 451 R. P. M. throughout the course of the fermentation period to prevent a lowering of pH to below 6.0.

Sugar tests were made at various intervals using the Somogyi procedured described in J. Biol. Chem., 160, 69 (1945). Fermentation was indicated to be complete after 11.5 hours following which the material was cooled to 55 to 60° F. and spray dried in a Schultz drier operated at inlet and exhaust temperatures of 290 and 150° F. respectively, and at a feed rate of approximately 1000 pounds of liquid per hour using a single nozzle unit. The residual liquid was stirred continuously throughout the drying operation.

A white fluffy powder was obtained which analyzed to 4% by weight of moisture and yielded upon reconstitution (12 gm. of dried egg white to 84 cc. of distilled water) a pH of 7.0 to 7.3 for different samples from the batch.

*Example II*

16,500 pounds of defrosted frozen egg whites, of pH 9.2, was warmed to 85° F. To this was gradually added 71 pounds of concentrated hydrochloric acid which had been diluted with 200 pounds of water. The egg white was vigorously agitated with a Lightnin Mixer and the adjusted pH was 6.2. Four pounds of yeast (*Saccharomyces cerevisiae*) equivalent to .025% by weight, was suspended in warm water and added gradually to the egg white which was then fermented with stirring for 12 hours at 80 to 85° F. At the end of this period, the reducing sugar was depleted and the pH of the egg white was 6.1.

The liquid was spray dried using a 12-nozzle unit with inlet and exhaust temperatures of approximately 295 and 160° F., respectively. The residual egg white liquid was stirred continuously during the period of 11 hours required for the drying. The reconstituted egg white had a pH of 7.3 to 7.6 for different samples from the batch.

*Example III*

A 1000 pound batch of defrosted frozen egg whites was warmed to 75° F. and carefully acidified with 4.3 pounds of concentrated HCl, diluted with 12 pounds of water, to a pH of 6.1. To the continuously stirred egg white was added 2 pounds of yeast (*Saccharomyces cerevisiae*) and the mixture was fermented for 3.5 hours at 75 to 80° F. to deplete the reducing sugar. The liquid was spray died as in Example I to give a powder which upon reconstitution had a pH varying between 7.5 and 7.8.

*Example IV*

A 16,500 pound batch of egg whites was warmed to 80° F. and acidified with 82.5 pounds of C. P. lactic acid (80%) which had been diluted with 250 pounds of water. The mass was stirred continuously at 451 R. P. M. during the entire process. Following acid addition, the resulting pH was 6.1. Four pounds of yeast (*Saccharomyces cerevisiae*) was added and fermentation of the egg white was completed after stirring for 13 hours at 80 to 85° F. The pH of the sugar-depleted egg white was 6.2.

The spray drying of the material was conducted at a feed rate of approximately 1600 pounds per hour using a 12-nozzle unit. The inlet temperature varied between 290 to 300° F. while the exhaust temperature was operated between 140 to 150° F.

The product showed a 3.1% moisture content and, upon rehydration, varied in pH between 7.4 to 7.7 for different samples from the batch.

While in the foregoing specification, we have set forth the details of various steps which may be employed in the carrying out of the process, it will be understood that such details may be varied widely by those skilled in the art without departing from the spirit of our invention.

We claim:

1. In a process for preparing a scum-free dried egg white having a rehydrated pH of 7.0 to 8.0, the steps of adjusting the pH of an egg white liquid to between 6.0 and 6.3, inoculating the material with *Saccharomyces cerevisiae*, fermenting the inoculated mixture while maintaining a pH of at least 6.0 by agitation until the reducing sugars are substantially depleted and spray drying the fermented mixture.

2. In a process for preparing a scum-free dried egg white having a rehydrated pH of 7.0 to 8.0, the steps of adjusting the pH of an egg white liquid to between 6.0 and 6.3, inoculating the material with *Saccharomyces cerevisiae*, fermenting the inoculated mixture at temperatures between 60 and 100° F. while maintaining a pH of at least 6.0 by agitation until the reducing sugars are substantially depleted and spray drying the fermented mixture.

3. In a process for preparing a scum-free dry egg white having a rehydrated pH of 7.0 to 8.0, the steps of adjusting the pH of an egg white liquid to between 6.0 and 6.3, inoculating the material with about .02 to .3% by weight of *Saccharomyces cerevisiae*, fermenting the inoculated mixture at temperatures between 60 and 100° F. while maintaining a pH of at least 6.0 by agitation until the reducing sugars are substantially depleted and spray drying the fermented mixture.

4. In a process for preparing a scum-free dried egg white having a rehydrated pH of 7.0 to 8.0, the steps of adjusting the pH of an egg white liquid to between 6.0 and 6.3, inoculating the material with *Saccharomyces cerevisiae*, fermenting the inoculated mixture at a controlled pH of at least 6.0 by agitation until the reducing sugars are substantially depleted and spray drying the fermented mixture.

References Cited in the file of this patent

UNITED STATES PATENTS

| | | |
|---|---|---|
| 1,996,800 | Fischer | Apr. 9, 1935 |
| 2,280,147 | Fischer | Apr. 21, 1942 |
| 2,460,986 | Josh et al. | Feb. 8, 1949 |

OTHER REFERENCES

"Food Technology," May 1951, pages 172 to 175, inclusive, article entitled "Storage Studies on Yeast-Fermented Dried Egg White."